United States Patent
Streich

[15] 3,656,312
[45] Apr. 18, 1972

[54] PROCESS FOR SEPARATING A LIQUID GAS MIXTURE CONTAINING METHANE

[72] Inventor: Martin Streich, Nieder-Eschbach, Germany

[73] Assignee: Messer Griesheim GmbH, Frankfurt, Germany

[22] Filed: Dec. 16, 1968

[21] Appl. No.: 784,102

[30] Foreign Application Priority Data

Dec. 15, 1967  Germany ..................... P 15 51 609.3

[52] U.S. Cl. ........................... 62/28, 62/34, 62/23, 62/26
[51] Int. Cl. ........................... F29j 3/00, F29j 3/02
[58] Field of Search .................. 62/23, 24, 27, 28, 31, 40; 260/676 A; 208/340, 365

[56] References Cited

UNITED STATES PATENTS

| | | | |
|---|---|---|---|
| 1,853,743 | 4/1932 | Pollitzer | 62/24 |
| 1,997,675 | 4/1935 | Bahlke | 208/365 |
| 2,180,435 | 11/1939 | Schlitt | 62/28 |
| 2,692,484 | 10/1954 | Etienne | 62/28 |
| 2,731,810 | 1/1956 | Hachmuth | 62/18 |
| 2,823,523 | 2/1958 | Eakin | 62/28 |
| 2,952,984 | 9/1960 | Marshall | 62/27 |
| 3,362,175 | 1/1968 | Burns | 62/28 |

Primary Examiner—Norman Yudkoff
Assistant Examiner—A. F. Purcell
Attorney—Paul W. Garbo

[57] ABSTRACT

A liquid gas mixture containing methane is pumped at a pressure below the critical pressure of methane through a heat exchanger in the top part of a rectifying column to reliquefy methane vapor prior to discharge of the mixture into the lower part of the rectifying column, while liquid enriched in higher boiling components of the mixture accumulating at the bottom of the column is heated. The reliquefied methane withdrawn from the column may be pumped at the pressure desired for its utilization.

2 Claims, 1 Drawing Figure

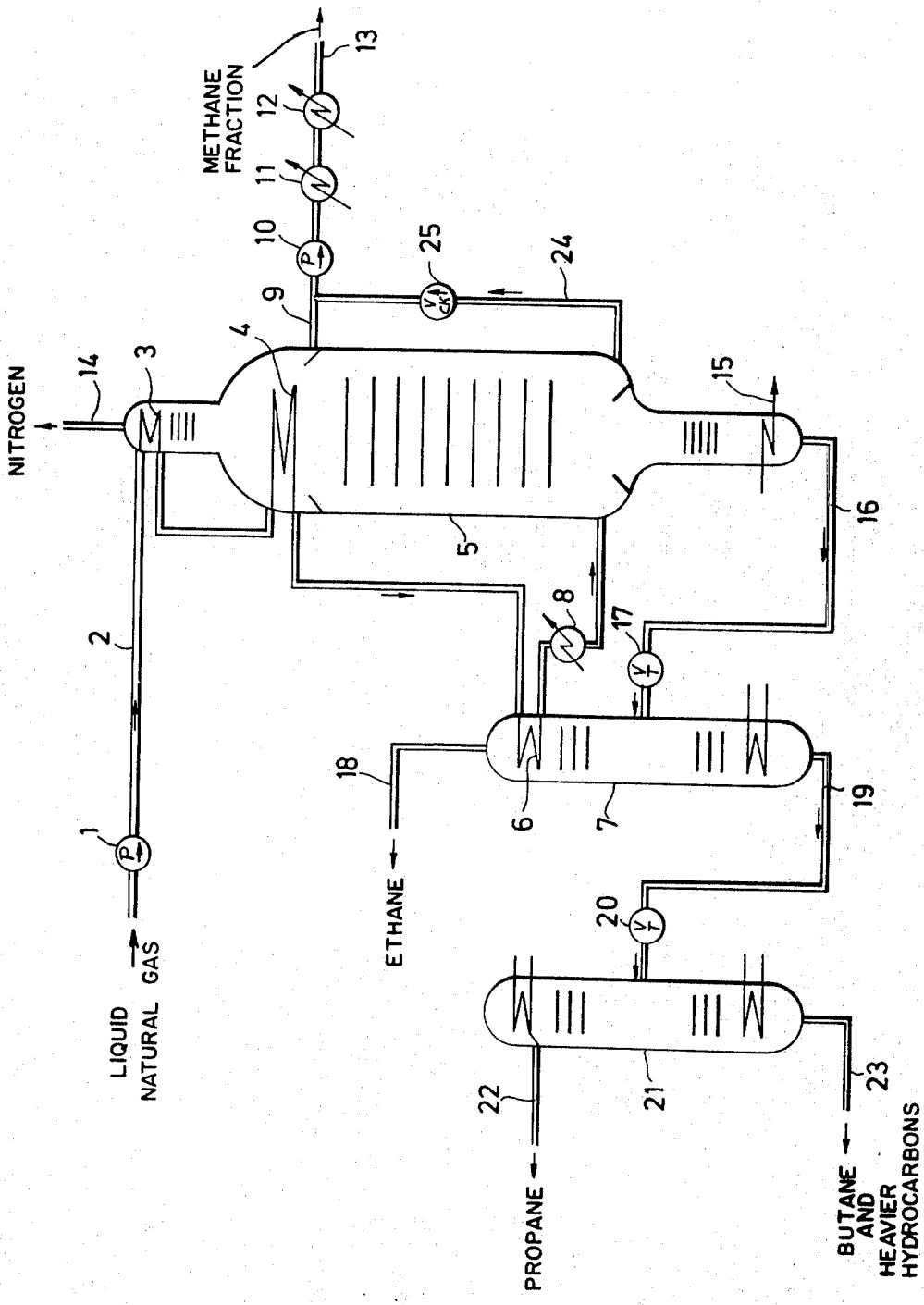

PROCESS FOR SEPARATING A LIQUID GAS MIXTURE CONTAINING METHANE

BACKGROUND OF THE INVENTION

This invention relates to a process for the separation of a liquid gas mixture containing methane, other low-boiling hydrocarbons and nitrogen. In particular, the process is directed to the separation of liquid natural gas.

The process of the invention is applicable where either the specific gravity or the calorific value of the gas mixture is to be adjusted to a predetermined figure or where the separation and recovery of hydrocarbons heavier than methane is desirable. After separation by this process, the methane-enriched fraction is fed to a pipeline at high pressure. The process of this invention is particularly suitable for the complete or partial separation of valuable heavy hydrocarbons such as ethane, propane, etc., from liquid natural gas.

German Pat. No. 1,122,560 discloses a process for separating a liquid gas mixture consisting of methane and heavier hydrocarbons into methane and heavier hydrocarbons in a rectifying column. In that process, the methane-enriched gas mixture accumulating in the column top is partially reliquefied by heat exchange with the incoming liquid gas mixture. The condensate serves as reflux for the column while the portion of the methane-enriched mixture that remains gaseous is expanded and supplied to the consumer. Contrary to this prior process, it is the object of the present invention to supply the separated methane at high pressure, i.e., a pressure which is higher than or close to the critical pressure of methane.

SUMMARY OF THE INVENTION

In accordance with this invention, a liquid gas mixture containing methane and heavier hydrocarbons, preferably liquid natural gas, is pumped into a rectifying column at a high pressure below the critical pressure of methane. Liquid enriched in heavier hydrocarbons accumulating in the sump of the column is heated, and the vapor or gaseous phase consisting mainly of methane rises to the top of the column. The basic feature of the process of this invention is that the gaseous phase of the mixture consisting mainly of methane and rising to the column top is cooled by heat exchange with the liquid gas mixture supplied to the column so as to reliquefy substantially completely the methane content of the gaseous phase.

A special advantage of this process is, therefore, the extremely low energy consumption. The illustrative embodiment of the invention which follows will further clarify the novel process.

BRIEF DESCRIPTION OF THE DRAWINGS

The FIGURE shows a process for separating natural gas by the method of the invention.

DESCRIPTION OF A PREFERRED EMBODIMENT

Liquid natural gas containing an appreciable quantity of nitrogen is pressurized to rectification pressure by pump 1 and conducted through line 2 and cooling coils 3 and 4 in the top portion of rectifying column 5. Then it flows through cooling coil 6 of ethane column 7, is heated in heater 8 and enters the lower portion of rectifying column 5. There, the liquid natural gas is separated into a gaseous phase containing methane and nitrogen which rises to the top of the column, and a liquid phase containing the heavier hydrocarbons which accumulates in the column sump. Methane and nitrogen are condensed by cooling coils 4 and 3. Part of the liquefied methane serves as reflux for rectifying column 5, the other part is withdrawn from rectifying column 5 through line 9, is pressurized to the desired pressure by pump 10 and is heated in heaters 11 and 12. The regasified natural gas is conducted through line 13 to the consumer. The nitrogen which remains gaseous is removed from column 5 through line 14.

The liquid in the sump of column 5 is heated by heater 15. The sump liquid consisting of hydrocarbons heavier than methane is withdrawn from column 5 through line 16, expanded through throttle valve 17, and fed to ethane rectifying column 7. Separated gaseous ethane leaves ethane column 7 through line 18. The portion of the sump liquid which remains liquid in ethane column 7 is passed through line 19 and throttle valve 20 and fed to propane rectifying column 21. Propane vapor is separated, condensed by outside refrigeration, and removed from propane column 21 through line 22. The remaining liquid containing butane and heavier hydrocarbons is removed from the bottom of propane column 21 through line 23. By way of line 24 and control valve 25, heavier hydrocarbons can be withdrawn from column 5 and added to the methane product stream in line 9, e.g., to regulate the calorific value of this product stream.

A distinct advantage of this process is that the free energy contained in the liquid natural gas is utilized for the compression and for the separation of the natural gas. Therefore, the energy consumption of the process is negligibly small. Essentially, energy is needed only for the two pumps 1 and 10. Ambient heat can be used for heaters 8, 11, 12 and 15.

What is claimed is:

1. A process for separating a high pressure liquid methane-enriched product from liquid natural gas containing ethane, other low-boiling hydrocarbons and nitrogen, which comprises pumping a stream of said liquid natural gas to rectification pressure and through first heat exchange passages in the upper portion of a first rectifying zone maintained at high pressure below the critical pressure of methane and through second heat exchange passages in the upper portion of a second rectifying zone maintained at high pressure below the pressure in said first rectifying zone, then heating said stream externally of said first and second rectifying zones to a temperature just below the boiling point thereof, discharging the heated stream into the lower portion of said first rectifying zone, heating by indirect heat exchange the liquid accumulating in the bottom of said first rectifying zone, withdrawing from said bottom said liquid enriched in said ethane and other low-boiling hydrocarbons and passing it without further heating through a throttle valve into said second rectifying zone, reliquefying substantially all of the resulting methane vapor in said first rectifying zone by contact with said first heat exchange passages, withdrawing reliquefied methane as said high pressure liquid methane-enriched product from said upper portion of said first rectifying zone, discharging a nitrogen-enriched gaseous product from the top of said first rectifying zone, and discharging an ethane-enriched gaseous product from the top of said second rectifying zone.

2. The process of claim 1 wherein the high pressure liquid methane-enriched product is withdrawn by pumping to a delivery pressure higher than the high pressure maintained in the first rectifying zone.

* * * * *